United States Patent
Jabsen

[15] 3,688,079
[45] Aug. 29, 1972

[54] WELDING NOZZLE
[72] Inventor: Felix S. Jabsen, 1324 Krise Circle, Lynchburg, Va. 24503
[22] Filed: Oct. 30, 1970
[21] Appl. No.: 85,541

[52] U.S. Cl. ................................219/136, 219/127
[51] Int. Cl. ............................................B23k 9/00
[58] Field of Search..............219/136, 132, 130, 127

[56] References Cited

UNITED STATES PATENTS

| | | | |
|---|---|---|---|
| 3,596,049 | 7/1971 | Ogden | 219/136 |
| 3,433,882 | 3/1969 | Henricksen et al. | 219/136 X |
| 2,845,524 | 7/1958 | Morley, Jr. et al. | 219/130 |
| 2,727,971 | 12/1955 | Mowry | 219/136 |
| 2,366,068 | 12/1944 | Sohn | 219/136 |

Primary Examiner—J. V. Truhe
Assistant Examiner—Gale R. Peterson
Attorney—J. Maguire

[57] ABSTRACT

A nozzle for a welding device having an arrangement of channels and guides on its annular face for the precise and selective alignment of a welding device to a very small target having extremely thin members in the production of a reproducible weld on a series of such targets with regard to size, configuration, rigidity and strength.

1 Claim, 5 Drawing Figures

PATENTED AUG 29 1972

3,688,079

INVENTOR.
Felix S. Jabsen

BY J. Maguire
ATTORNEY

WELDING NOZZLE

This invention relates to an improved nozzle for a welding device.

More particularly, this invention relates to a nozzle of a welding device having means for use in the exact and positive engagement of a relatively small target having extremely thin-wall members in order to achieve an optimum in effectiveness of a resulting weldment and enhanced efficiency of operation in the shortest possible time.

In the past, grid structures in the form of lattices have been used to support the fissionable rods of a reactor core in positive positions, at predetermined distances, relative to one another. Instability in the core may be caused by minor changes in the distribution of such fuels due to a extremely minute displacement of the fuel rods. Therefore, such lattices must be mechanically rigid so as not to vary position, or to cause an obstruction to, or variation of the flow-path of the coolant through the spaces between the fissionable rods of the core. This action avoids the creation of hot spots within the core and a change in reactivity of the power generating unit which could be potentially dangerous.

The difficulty encountered with such conventional lattices is that to provide the desired positioning of the fuel rods in a positive manner, the opening originally defined by the extremely thin spacer members for the reception of the fuel rods is deliberately smaller in cross section than that of the rod itself. However, as a result, during the insertion of the rods into the lattice or during the movement of the lattices over the rods, a tremendous amount of tensional force is exerted on the extremely thin spacer members of the lattice. If this stress results in a dislocation of the junction between such spacer members, the difficulties heretofore described will be encountered and a potentially dangerous condition will be created in the reactor core.

What is needed is a strong, permanent and rigid joint, at each of the junctions, of the extremely thin spacer members making up the lattice on a reproducible and efficient basis. In the past, an attempt was made to use conventional welding or brazing techniques to form the joint of the spacing members but this proved itself to be undesirable due to lack of strength and the resulting brittleness of the joining means. In addition, a considerable amount was required in both labor and inspection cost to produce an effective lattice having a great number of such junctions in its structure and this also made the conventional techniques further undesirable. This problem is especially acute when it is realized that merely one faulty joint or weld may be the basis for the rejection of the entire lattice.

Another problem presented by the joinder of the extremely thin non-ferrous spacer members is the effect of faulty welding techniques where such metal pieces melt and exhibit fluid flow, it can be assured in such a case that the resulting weld would be incorrectly made and, therefore, unacceptable. In extreme cases, a situation could also be encountered where the junction would be completely burnt out. In either of the aforesaid cases, the entire lattice would be rejected.

With regard to the skill required to produce an effective lattice, it has been found to depend on both the nature of the operation and specific equipment used. In the past, relatively low volume operations in job shop quantities usually called for hand operated equipment, consequently satisfactory results were dependent to a very large measure on the skill and experience of the operator. However, where speed of operations was required, in situations such as the present specialized application, ease, skill, expertness, and dexterity were called for on the part of the operator to produce the multiple joint of the members of the lattice in the state required.

The subject invention answers the needs of the art, as heretofore described, with special emphasis on the production of strong, permanent and rigid joints for the extremely thin-wall members of a lattice, the latter being used in supporting fuels in the core of a nuclear reactor.

In practice, it has been found that if the arc of the conventional welding device is positively positioned in a predetermined attitude relative to each of a multiple series of the aforedescribed junctions, each of the joinders or welds produced by such device at such junctions will be substantially equivalent in size, configuration, rigidity, strength, and permanence. Once the parameters of the predetermined attitude of the device are known, the device of the present invention can then be used to aid in the production of an acceptable joint or weld on a reproducible basis in an effective manner for any situation involving a variation of material or configuration of the structure being joined.

It is therefore an object of this invention to provide alignment means for a welding device for use in positive positioning of the functioning arc of such device in a predetermined attitude relative to an extremely small target.

Another object of this invention is to provide a nozzle having alignment means for separable engagement to the mouth of a welding device.

A further object is to provide an improved nozzle of a welding device for use in the reproducible production of relatively small joints or welds at the junction of extremely thin members in an effective and efficient manner.

Other objects and many of the attendant advantages of this invention will be readily appreciated as the same become better understood by reference to the following detailed drawing wherein.

Similar numerals refer to similar parts throughout the several views.

Broadly, this invention encompasses an arrangement of a plurality of relatively deep channels on the annular face of a nozzle of the conventional welding device in combination with at least one pair of parallel guides, the latter straddling one of the channels. A combination such as this has been used to achieve a great number of acceptable welds at the junctions of ends straps and cross members of a spacer grid or lattice and such results were highly satisfactory with respect to size, rigidity, strength, and configuration, even though the members joined together were of extremely small thickness.

More specifically, the arrangement of the channels was such that each of the channels was within an angle of about 90° to an adjacent channel and the guides were in shape of two longitudinally extending lugs which were positioned adjacent each of the sides of the same channels in a substantially parallel fashion. The lugs and channels in this structure being utilized for the selective and precise alignment of the nozzle, electrode, and resulting arc with the junction to be welded.

Another arrangement, which may be utilized to increase the latitude in regard to the configuration of junctions that may be welded with the device of this invention, is such that each of the channels is within about 90° of at least two other channels. In this situation, as in the aforesaid arrangement, there may be more than one set of parallel guides straddling a number of the channels in the fashion described. Further latitude in the configuration of the junction that may be acceptably joined is also achieved when each of the channels in the annular face is positioned at an angle of about 180° to another channel and at least one of the parallel sets of guides lie adjacent the same channel.

Figure 1:
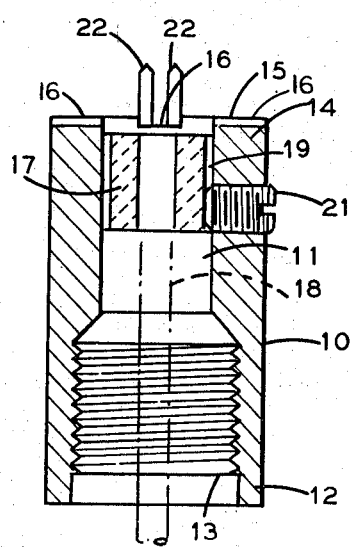
FIG. 1 is a cross-sectional view of the device of this invention.
Figure 2:
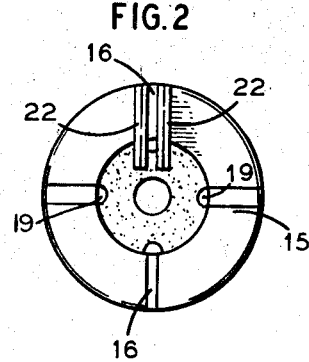
FIG. 2 is a top plan view of the device of FIG. 1.

In a preferred embodiment of this invention, as shown in FIG. 1 and 2, the alignment nozzle is provided with a cylindrical body having a bore 11 of open-end construction. The bottom end portion 12 of the body is provided with internal attachment means 13 for separable engagement to the head of a welding device (not shown), while the top end 14 of such body terminates in an annular ring-like face 15 having a plurality of radially extending channels 16. The cylindrical body 10 houses an insulator 17, which is axially aligned relative to the bore, and which is adapted to receive an axially aligned electrode 18. The insulator is provided with a plurality of vents 19 which extend therethrough in longitudinal fashion and are used for the escape of gas from the welding device in the venting operation. Means 21 of the screw-type variety are provided in the body 10 for the positive positioning of the insulator 17 in the bore. A pair of guides 22 in the shape of lugs extends from adjacent sides of one of the channels in a substantially parallel fashion. The lugs 22 and channels 16 being used for the selective and precise alignment of the nozzle's attitude relative to the relatively thin members of a grid-like structure.

Figure 3:
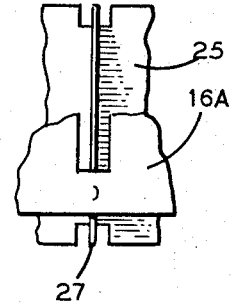
FIG. 3 is a side view in section of a typical grid structure.

In one specialized application, in the fuel assembly of a reactor core, the aforedescribed device was utilized to weld numerous junctions of a spacer grid 25, between the end strap members 16A and the cross member strips 27 in the configuration shown in FIG. 3. In the past, acceptable welds were difficult, if not impossible, to obtain on such extremely thin members especially if they were made of the nickel of zirconium alloy type of material. However, utilizing the described device, the welds produced in such a network were highly satisfactory and this result was achieved without the addition of any filler material to the base structure. The results achieved by this device are due to the fact that the attitude of the welding device is maintained substantially constant from junction to junction. The channel provided in the annular face of the described device centers the welding gun itself in the horizontal plane, while the guides or lugs simultaneously center the gun in the vertical plane, resulting in an accurate and reproducible alignment of the electrode and the resulting arc with the junction desired to be joined.

Figure 4:
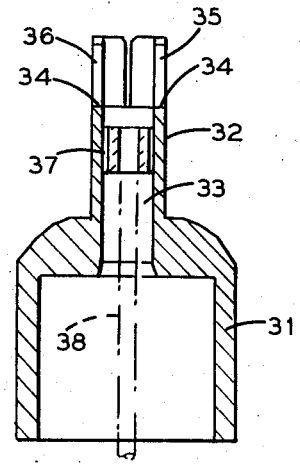
FIG. 4 is a cross-sectional view of another embodiment of the device.
Figure 5:
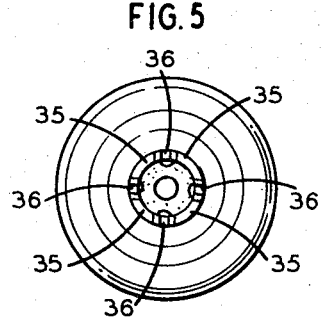
FIG. 5 is a top plan view of the device of FIG. 4.

In another preferred embodiment, the nozzle has the structure shown in FIG. 4 and 5 wherein the cylindrical body portion 31 is extended in the form of an elongated cylindrical nipple 32 having a bore 33 of open end construction. The nipple 32 terminates in an annular ring-like face 34 provided with four arc-shaped guides 35 in spaced relationship to one another. The configuration and positioning of the guides is such that any two adjacent guides define a channel 36 therebetween of significant depth. The channels being within about 90° to one another as shown in FIG. 5. In this manner, the attitude of the electrode and the arc are aligned and accurately centered with the cross section of the grid and prevent the production of an unacceptable, off centered, weld. The insulator 37 fitted in bore 33 is adapted to receive an electrode 38 which is axially aligned and recessed relative to the bore of said elongated nipple as shown in FIG. 4. The insulator 36 is a protective measure used to minimize the degree of arcing of the conventional welding device.

The devices heretofore described have been utilized in an effective manner to produce highly satisfactory welds or joints which were acceptable from the standpoint of size, configuration, rigidity, strength, and permanence under a wide variety of service conditions involving the loading and use of the resulting fuel assembly in the core of a nuclear reactor.

In general, a Tungsten Inert Gas welding process was used with conventional equipment for the production of such welded joints. Through the use of the aforesaid devices of this invention, it was found that acceptable welds or joints could be achieved on a reproducible basis in an efficient manner and in the shortest possible operating time. The time required to produce one weld was between about 0.50 to 2.0 seconds at 50 amperes using a conventional welding machine operating on alternating current. The pressure of the inert gas was approximately 30 lbs. per sq. in. Also, a minimal of time was required for inspection of the lattices because of the perfection of the resulting weld.

What is claimed is:

1. A thin plate alignment nozzle for a gas-shielded welding device comprising, a cylindrical body having a centrally disposed axial bore adapted to receive the shielding gas, a generally cylindrical insulator within said bore and spaced a relatively short distance from one end thereof, said insulator also having a centrally disposed axial bore adapted to receive at least a portion of the welding device, said insulator having shielding gas vent passages extending the length of said insulator formed about the outer periphery thereof, threaded means generally transverse to the axis of said body and protruding through said body and into said body bore to positively position said insulator within said body bore, an end face on said body adjacent to said positioned insulator generally perpendicular to the axis of said body, said face having four radially disposed channels spaced at 90° intervals from each other and formed in the surface of said face in communication with the outer surface of said body and said axial body bore, two parallel lugs protruding from one of said channels in said end face in an axial direction, said lugs being spaced from each other by at least the thickness of the thin plate, and threaded internal attachment means formed in said axial body bore adjacent to the other end of said body for selective engagement with the welding device.

* * * * *